Aug. 29, 1933. P. BUHLER 1,924,977
REEL FOR MOTION PICTURE MACHINES
Filed May 8, 1931
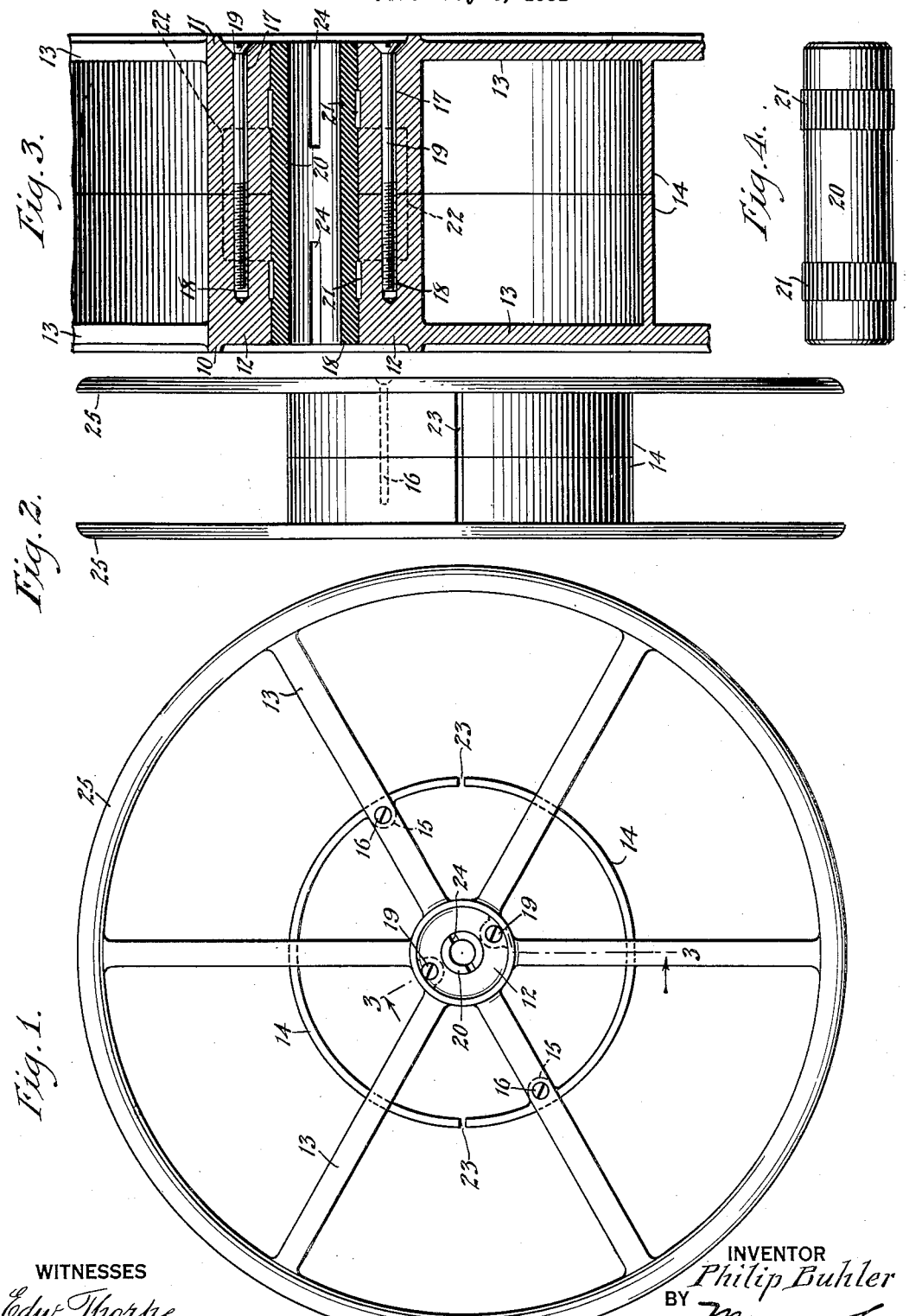
WITNESSES
Edw. Thorpe
E. B. Marshall
INVENTOR
Philip Buhler
BY Munn & Co.
ATTORNEY Patented Aug. 29, 1933

1,924,977

UNITED STATES PATENT OFFICE 1,924,977

REEL FOR MOTION PICTURE MACHINES

Philip Buhler, New York, N. Y., assignor of one-half to Frank Buhler, New York, N. Y.

Application May 8, 1931. Serial No. 535,976

6 Claims. (Cl. 242—70)

An object of the invention is to provide a reel for motion picture and similar machines, which is inexpensive to manufacture and which will be steady in its rotation without the possibility of rattling. The reel is light in weight and is preferably made of rustless metal with spokes having flat inner sides which will not injure a film when the reel is disposed on its side and the film rests against the spokes.

Another object of the invention is to provide a reel made of two parts which are die-cast and which are held together by screws at their hub portions. A bearing member is rigidly secured in the hub portions of the parts. Preferably each part is provided with a spool member, the spool members uniting to form a spool. The two parts are preferably held together at their spool portions by screws, as well as at their hubs.

Additional objects of the invention will appear in the following specification in which the preferred form of the invention is described.

In the drawing similar reference characters refer to similar parts in all the views, of which Figure 1 is a side view of the reel, Figure 2 is an end view of Figure 1, Figure 3 is an enlarged sectional view on the line 3—3 of Figure 1, and Figure 4 is a view of the bearing member which is held rigidly in the hub portions of the reel.

By referring to the drawing it will be seen that the reel is made with two principal parts 10 and 11 which are preferably die-cast of an aluminum and zinc compound which is very light and will not rust. Each of the parts 10 and 11 has a hub portion 12 and spokes 13 extending therefrom, there being integral with the spokes spool portions 14 which unite to make a spool when the parts are secured together. Extending inwardly from two of the spokes 13 on each of the parts there are bearing members 15 which are integral with the said spokes and with the spool portions 14. It will, therefore, be understood that by die-casting these two parts, they will be made absolutely true and that, when the parts are secured together, a reel will be produced which will rotate without any rocking movement and which will not rattle. This is important when films are used which serve to produce sound as well as pictures.

The bearing members 15 on one of the parts have apertures and the bearing members on the companion parts have threaded apertures so that screws 16 may be disposed in the first mentioned apertures and mesh in the threaded apertures to hold the parts at the spool portions securely together. One of the hubs 12 on the part 11 is also provided with apertures 17 which are in alignment with threaded apertures 18 on the hub portion 12 on the other part 10, so that screws 19 may be disposed in the apertures 17, the screws meshing in the threaded apertures 18 to hold the two parts securely together at their hubs 12.

As will be seen by referring to the drawing, a bearing member 20 is provided having two sets of radially extending teeth 21 which are spaced apart so that the bearing member may be driven into the hub portion 12 of the part 10 with its radially extending teeth cutting into or gripping the hub portion to secure the bearing member 20 to the part 10, when the other part may be driven on to the bearing member, so that the second set of teeth 21 will cut into and grip the hub portion 12 of the part 11.

It will be understood that the bearing member 20 not only is secured rigidly to the parts 10 and 11, as has been stated, but these parts are also held rigidly to each other by the screws 16 and 19.

If desired, portions of the parts 10 and 11 at their hub portions 12 may be cut out, as indicated at 22, to lighten the parts.

As will be seen by referring to Figure 1 of the drawing, the spool portions 14 have slots 23 in which the end of a film may be introduced. The bearing members 20 are preferably provided with slots 24 to assist in securing the reel to parts of the motion picture machine.

The spokes on each part are connected at their outer terminals by a rim 25.

What is claimed is:

1. In a reel, two members, each having a hub portion with spokes at the outer end of the hub portion and a rim connecting the outer terminals of the spokes; means for holding the two members at their hub portions, and a bearing member rigidly secured to the hub portions by teeth on the bearing member which cut into the hub portions, the teeth serving as an additional means to hold the hub portions together.

2. In a reel, two members, each having a hub portion with spokes at the outer end of the hub portion and a rim connecting the outer terminals of the spokes; means for holding the two members together at their hub portions, and a bearing member disposed in the hub portions and having two sets of radially extending teeth, the sets of teeth being spaced apart and each set of teeth gripping the hub portion on a member at cuts made by the teeth for holding the hub portions rigidly relatively to each other.

3. In a reel, two members, each having a hub portion with spokes at the outer end of the hub portion and a rim connecting the outer terminals of the spokes; means for holding the two members at their hub portions, and a bearing member disposed in the hub portions and rigidly secured thereto by teeth on the bearing member engaging the hub portions at cuts made by the teeth, the hub member being provided with a slot or slots.

4. In a reel, two integral members each having a hub portion with spokes at the outer end of the hub portion, a rim connecting the outer terminals of the spokes and a spool portion on the spokes; means for holding the two members together at their hub portions and also adjacent their spool portions, and a bearing member rigidly secured to the hub portions by teeth on the bearing member engaging the hub portions at cuts made by the teeth, the bearing member being provided with a slot or slots.

5. In a reel, two integral members each having a hub with a radially extending portion at the outer end of the hub, a spool portion on the radially extending portion and a bearing on the radially extending portion; there being an aperture in the hub of one member and a threaded aperture in the hub of the other member, the apertures being in alignment when the inner ends of the hubs abut in normal position, and there being an aperture in the bearing on one of the members and a threaded aperture in the bearing on the other member which are in alignment when the members are in normal position, screws disposed in the apertures for holding the two members together, and a bearing member rigidly secured in the hubs by teeth on the bearing member which are disposed in cuts in the hubs made by the teeth.

6. In a reel, two integral members each having a hub with a radially extending portion at the outer end of the hub, a spool portion spaced from the hub on the radially extending portion and a bearing on the radially extending portion adjacent the spool portion; there being an aperture in the hub of one member and a threaded aperture in the hub of the other member, the apertures being in alignment when the inner ends of the hubs abut in normal position, and there being an aperture in the bearing on one of the members and a threaded aperture in the bearing on the other member which are in alignment when the members are in normal position, screws disposed in the apertures for holding the two members together, and a bearing member rigidly secured in the hubs by teeth on the bearing member which are disposed in cuts in the hubs made by the teeth.

PHILIP BUHLER.